Figure 1:
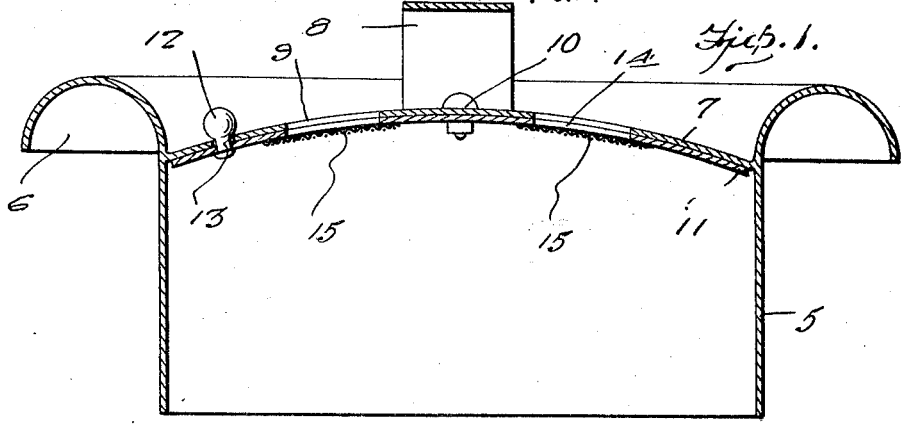

Sept. 22, 1925.

C. M. ZADDOCK

MILK CAN COVER

Filed June 23, 1924

1,554,941

Inventor
C. M. Zaddock

By Clarence A. O'Brien
Attorney

Patented Sept. 22, 1925.

1,554,941

UNITED STATES PATENT OFFICE.

CLARA M. ZADDOCK, OF BELLINGHAM, WASHINGTON.

MILK-CAN COVER.

Application filed June 23, 1924. Serial No. 721,828.

*To all whom it may concern:*

Be it known that I, CLARA M. ZADDOCK, a citizen of the United States, residing at Bellingham, in the county of Whatcom and State of Washington, have invented certain new and useful Improvements in Milk-Can Covers, of which the following is a specification.

This invention relates generally to the art of milk containers, and has more particular reference to a cover construction therefor, the primary object of the invention residing in the provision of a container wherein means is provided for permitting the entrance of air into the container resulting in the effective ventilation thereof, which is necessary in the shipment of milk.

An additional object of the invention is to provide an article of the above character that is extremely simple of construction, and one that may be manufactured and marketed at a cost but slightly greater than that of milk can covers now generally employed in the closing of milk cans.

With the foregoing and other objects in view as the nature of the invention will be better understood, the same comprises the novel form, combination, and arrangement of parts hereinafter more fully described, shown in the accompanying drawing and claimed.

In the drawing wherein like reference characters indicate corresponding parts throughout both of the figures.

Figure 2:
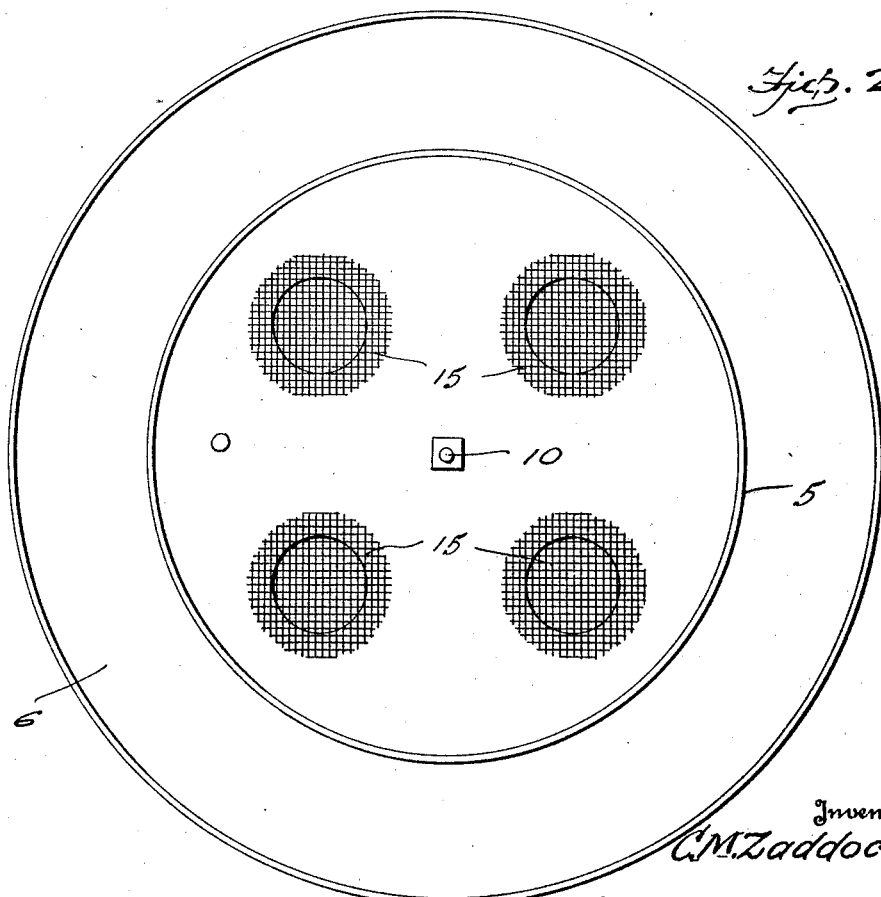

Figure 1 is a detailed vertical sectional view taken through a milk can cover constructed in accordance with the present invention, and Figure 2 is a bottom plan view thereof.

Now, having particular reference to the drawing, my novel milk can cover constitutes the provision of a relatively elongated sheet metal cylindrical member 5, that is adapted to be engaged within the open end of the milk can, the upper end thereof being turned over to provide a receiving channel 6 for the usual curved flange or bead at the upper end of the conventional form of milk can.

Within the cylindrical member 5 adjacent the upper end thereof, is a dome shaped cover wall 7, that is formed or otherwise provided at its central point with a suitable handle 8.

The wall 7 of the lid is formed with a plurality of relatively large circular openings 9, and secured for close relation with the inner side of said wall through the medium of a central rivet or bolt and nut connection 10 is a circular concavo-convex plate 11. This plate 11 is provided at its marginal edge with an upwardly extending knob or finger piece 12 that works within a slot 13 of the lid cover wall 7. Said plate 11 is also formed with a plurality of circular shaped openings 14 that may be placed in registration or out of registration with the openings 9 of the lid wall 7 by turning the plate through the medium of the knob or finger piece 12, it being of course understood that when the openings of the plate 11 and lid cover wall 7 are in registration, air will be allowed to pass into the milk can, resulting in the ventilation of the same.

Beneath the openings 14 in the plate 11 and suitably secured to said lid are discs or wire screening or other foraminous material 15, that obviously prevents the inlet of dirt or other foreign matter into the can when the openings are in registration.

It will thus be seen that I have provided a highly novel and useful form of milk can closure, and one that will meet with all of the requirements for a successful commercial use.

Having thus described my invention, what I claim as new, and desire to secure by Letters-Patent, is:

In a milk can cover of the character described, a cylindrical member formed adjacent its upper end with a transverse wall having a screened opening therein, said member adapted to be positioned within the open end of a milk can, an outwardly extending channel flange encircling the cylindrical member at it supper end for engagement over the upper end of the milk can, a plate member disposed for rotation upon the under side of the transverse wall of said cylindrical member and being formed with an opening for registration with the opening in said transverse wall, and means extending through the transverse wall for moving said plate so as to position the opening thereof in and out of registration with the openings in said transverse wall.

In testimony whereof I affix my signature.

CLARA M. ZADDOCK.